Patented Oct. 17, 1922.

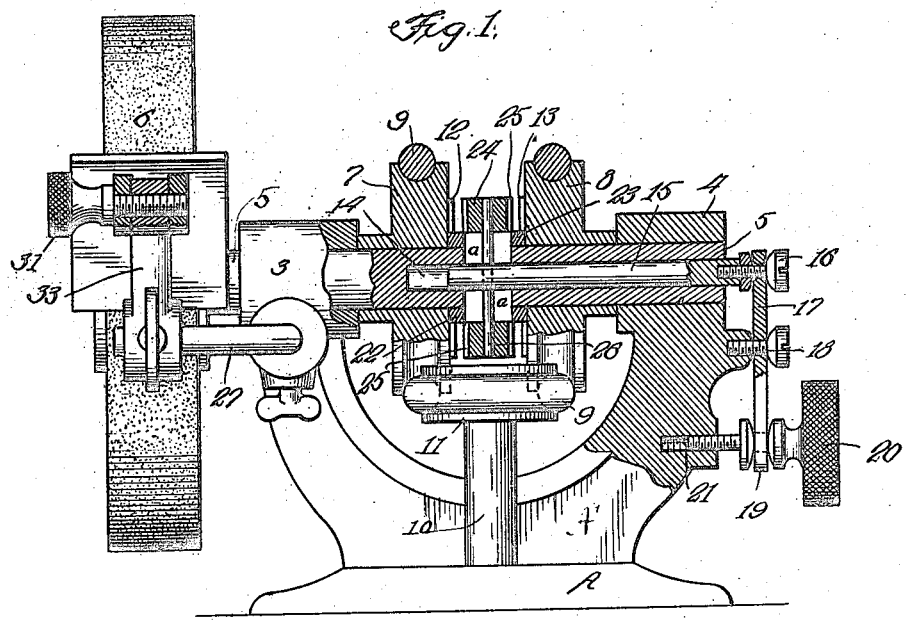

1,432,402

UNITED STATES PATENT OFFICE.

ALVORD M. McLERAN, OF CHICAGO, ILLINOIS.

POWER TOOL GRINDER.

Application filed February 9, 1920. Serial No. 357,255.

*To all whom it may concern:*

Be it known that I, ALVORD M. McLERAN, a citizen of the United States, residing at Chicago, Cook County, Illinois, have invented certain new and useful Improvements in Power Tool Grinders, of which the following, taken in connection with the drawings, is a description.

My invention relates to grinding tools of the class employed in machine shops and other places where sharp edged tools are used, and is so constructed and arranged that it may be driven from any suitable line shaft to which a pulley can be attached.

A further object of my invention is to provide means easily and quickly adjustable whereby the direction of rotation of the grinding wheel may be reversed to accommodate different tools to be operated upon.

It is also an object of my invention to arrange in proximity to the grinding wheel, means for adjusting the tool to be ground and at the proper fixed angle to the wheel to grind the proper bevel on the edge sharpened.

These and other features of the machine will be apparent to those skilled in the art to which my invention relates:—

In the accompanying drawings I have illustrated what I now consider the preferred form of the essential elements to be embodied in my invention, and in these drawings:—

Fig. 1 is a side elevation, partly in section of an embodiment of my invention and:

Fig. 2 is an end elevation of the machine.

Referring to the drawings A represents a suitable base from which rises a bearing member A′ which in turn supports the bearing blocks 3 and 4. 5 is a shaft which is mounted in said blocks 3 and 4 and which supports the movable parts of my machine. Mounted upon one end of the shaft 5 which extends through the bearing 3 is a carborundum or emery wheel 6. 7 and 8 are pulleys mounted upon the shaft 5 preferably between the blocks 3 and 4, each of which pulleys supports a belt 9 which is connected with a suitable source of power.

A vertically extending stub shaft 10 rises from the base A and supports upon the upper end thereof a sheave 11 over which the belt 9 passes, in traveling from one to the other of the pulleys 7 and 8.

Projecting from one face of each of the pulleys 7 and 8 is a clutch engaging member 12—13, which is adapted to be engaged by a corresponding clutch member mounted upon the shaft 5 between said two pulleys.

The shaft 5 is bored centrally thereof for a portion of its length as shown at 14 in Fig. 1. Fitting into this bore is a rod 15 by means of which the clutch mechanism is actuated. The rod 15 projects a short distance beyond the end of the shaft 5 and has engaging the end thereof a screw 16. 17 is a lever, fulcrumed at 18 and having one end engaged by the screw 16, the opposite end 19 being engaged by the screw 20 which projects into a socket 21 formed in the bearing block 4.

Mounted upon the shaft 5 are the collars 22—23, one of which abuts against the inner face of each of the pulleys 7 and 8.

24 is a clutch ring surrounding the shaft 5 between the pulleys 7 and 8, and which carries upon opposite faces thereof the ribs or projections 25, which are adapted to engage alternately with corresponding ribs or projections 12—13 on the inner face of the pulley 7 and 8.

As the parts are assembled between the bearing blocks 3—4 an annular recess *a* is provided between the rings 22—23 and extending through the ring 24 in the direction of its diameter, and through the rod 15, is a pin 26. By this means, the clutch ring 24 and the rod 15 are at all times fixedly secured together and may be adjusted in a longitudinal direction bringing the engaging clutch members upon either side of the ring 24 into engagement with a corresponding member on the pulley 7 or 8 as desired depending upon the direction in which the wheel 6 is to be revolved.

When the clutch ring is to be brought into contact with the pulley 7, the adjusting screw 20 is partially withdrawn from the socket 21, which through the lever 17 presses against the rod 15 forcing it into the bore 14 until the clutch member 25 is brought into engagement with the corresponding member 12 and a reverse action is necessary to move the clutch ring 24 in the opposite direction and bring the clutch member 25 into engagement with the corresponding clutch member 13 upon the pulley 8.

Adjustably mounted in bearing member 3 are the rods 27—28, extending into operative relation with the wheel 6 upon opposite sides of the peripheral face thereof. Supported upon each of these rods is a guide 29—30 which in turn is movably attached by the thumb screws 31—32 to a support 33—34, which is adjustably fixed to the rod 27—28 by means of the set screws 35—36.

By reason of these different adjustments the faces of the guide members 29—30, may be adjusted with respect to the incline toward the periphery of the emery wheel, so that any tool required to be sharpened may be held upon the guide plate or between it and the periphery of the wheel in the proper position to secure the desired bevel or angle.

In the construction here shown I have illustrated a power driven grinding mechanism but contemplate the use of the guide members 29—30 attached to a hand operated wheel as well, as it will be observed they are in no way connected with the driving mechanism.

I claim:

1. In a tool grinder, the combination of a grinding wheel mounted upon a rotatable shaft, tools mounted on said shaft, clutch engaging members formed on opposite faces of said tools, a clutch member mounted on said shaft between said tools, means for actuating said clutch to engage either of said tools, rods extending into operative relation with the aforesaid grinding wheel upon opposite sides of the peripheral face of said wheel, a guide member supported upon each of the rods and adjustable toward and from the face of the grinding wheel, and means for locking said guide members in different positions with respect to the face of the grinding wheel.

2. In a tool grinder, the combination of a base member, a grinding wheel mounted upon a rotatable shaft, tools on said shaft, clutch engaging members formed on opposite faces of said tools, a clutch member mounted on said shaft between said tools, means for actuating said clutch to engage either of said tools, rods adjustably mounted in bearing members in operative relation with the aforesaid grinding wheel, guide members adjustable on said rods to and from the peripheral face of the grinding wheel and means for adjusting and locking said guide members in different angular positions with respect to the peripheral face of said wheel.

3. In a tool grinder, the combination of a grinding wheel mounted upon a rotatable shaft, tools mounted on said shaft, clutch engaging members formed on opposite faces of said tools, a clutch member mounted on said shaft between said tools, means for actuating said clutch to engage either of said tools, guide supporting rods adjustably mounted in bearings in proximity to the aforesaid grinding wheel, guide members movably mounted on said rods and means for locking them in different adjusted positions toward and from the peripheral face of said wheel, the positions of said guide members movable to different angles with respect to the peripheral face of the grinding wheel, and means for locking said guide members in different fixed positions, substantially as described.

In testimony whereof I have signed this specification.

ALVORD M. McLERAN.